Figure 1:
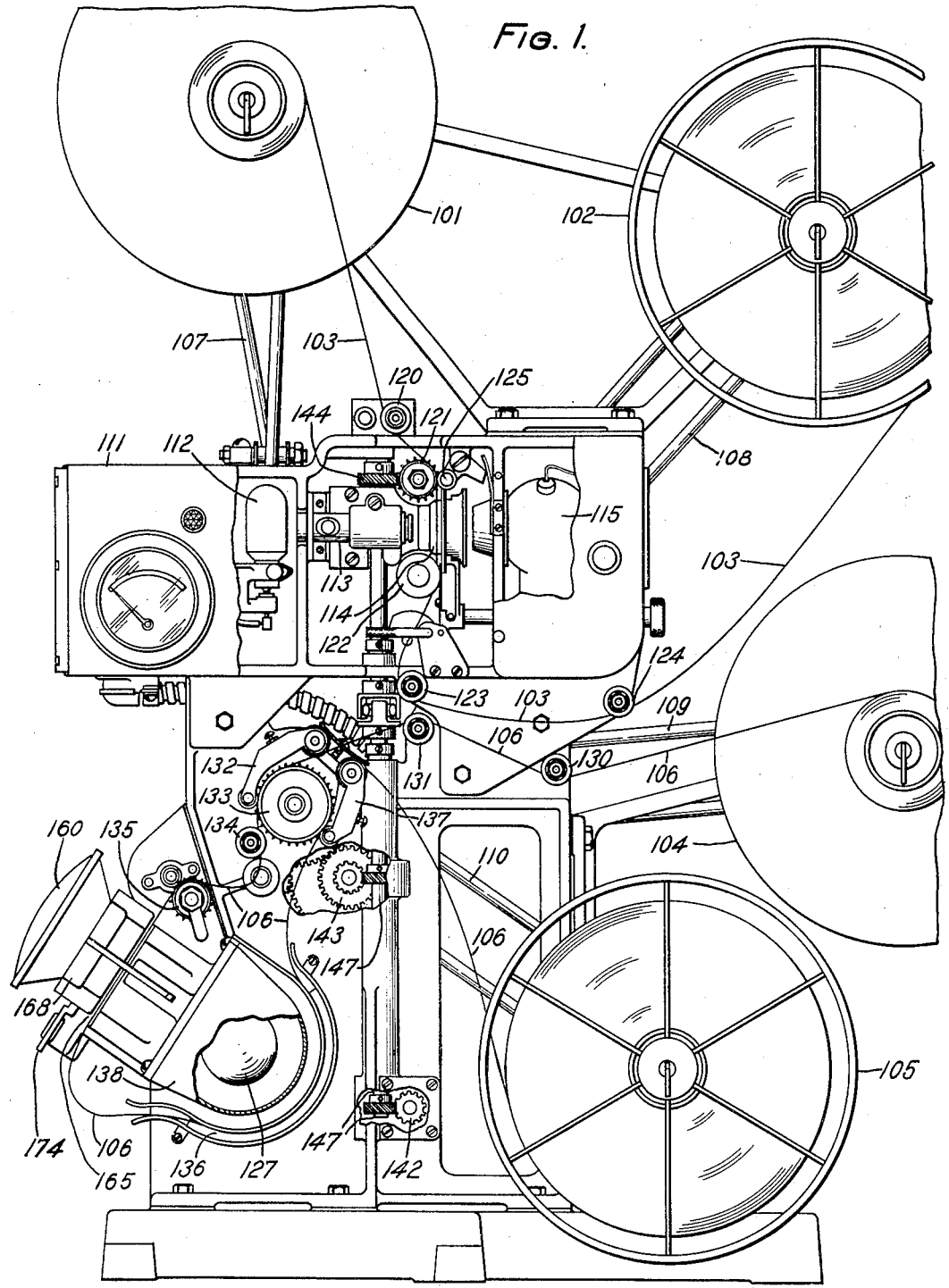

Aug. 8, 1933.   J. J. KUHN ET AL   1,921,469
FILM EDITING MACHINE
Filed March 1, 1930   3 Sheets-Sheet 1

INVENTORS J. J. KUHN
R. V. TERRY
BY
G. H. Heydt
ATTORNEY

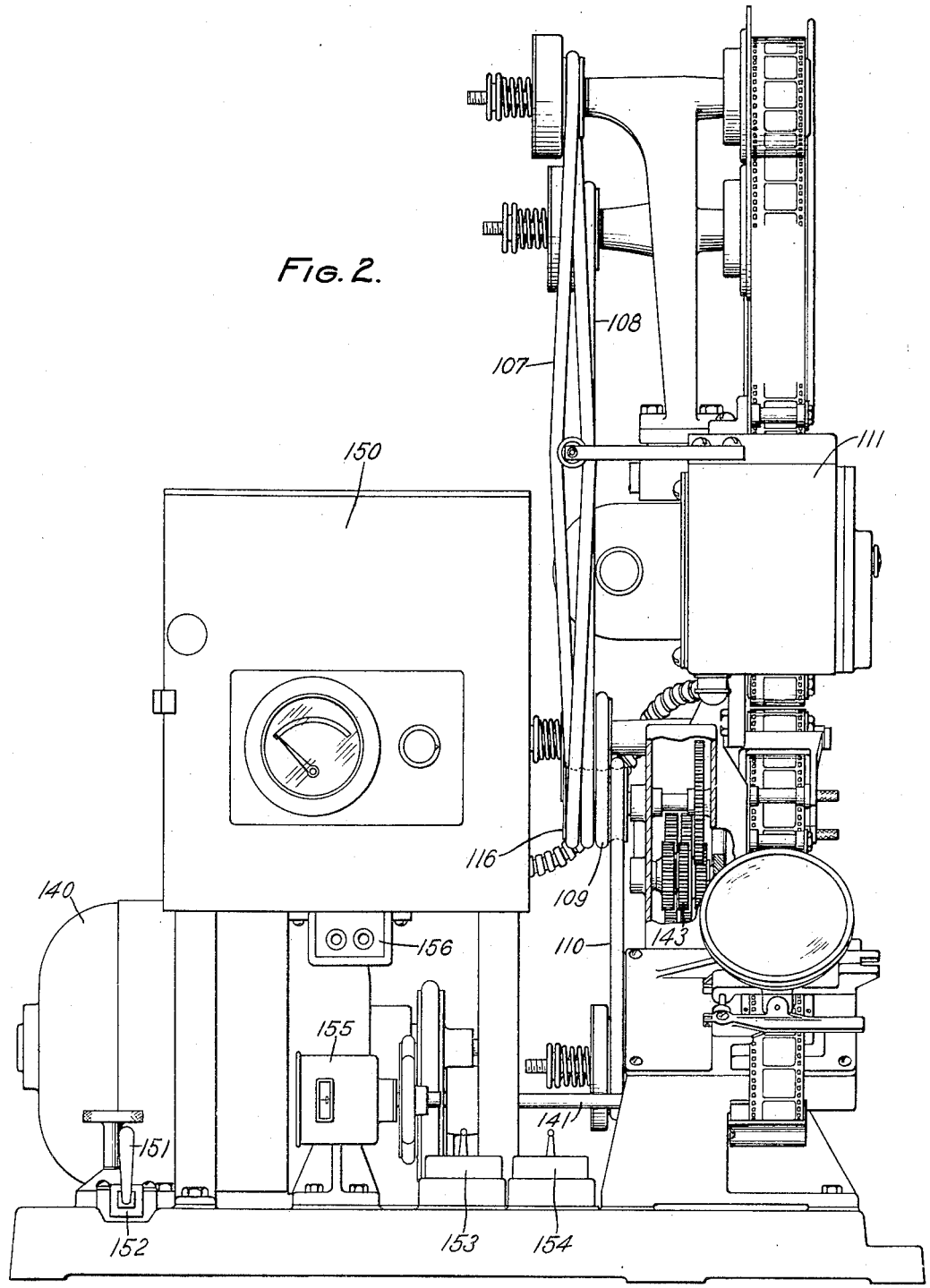

Aug. 8, 1933.  J. J. KUHN ET AL  1,921,469
FILM EDITING MACHINE
Filed March 1, 1930  3 Sheets-Sheet 3
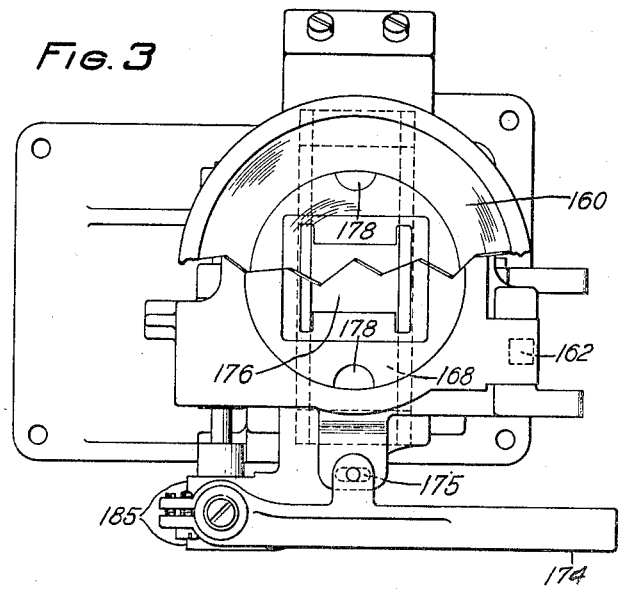
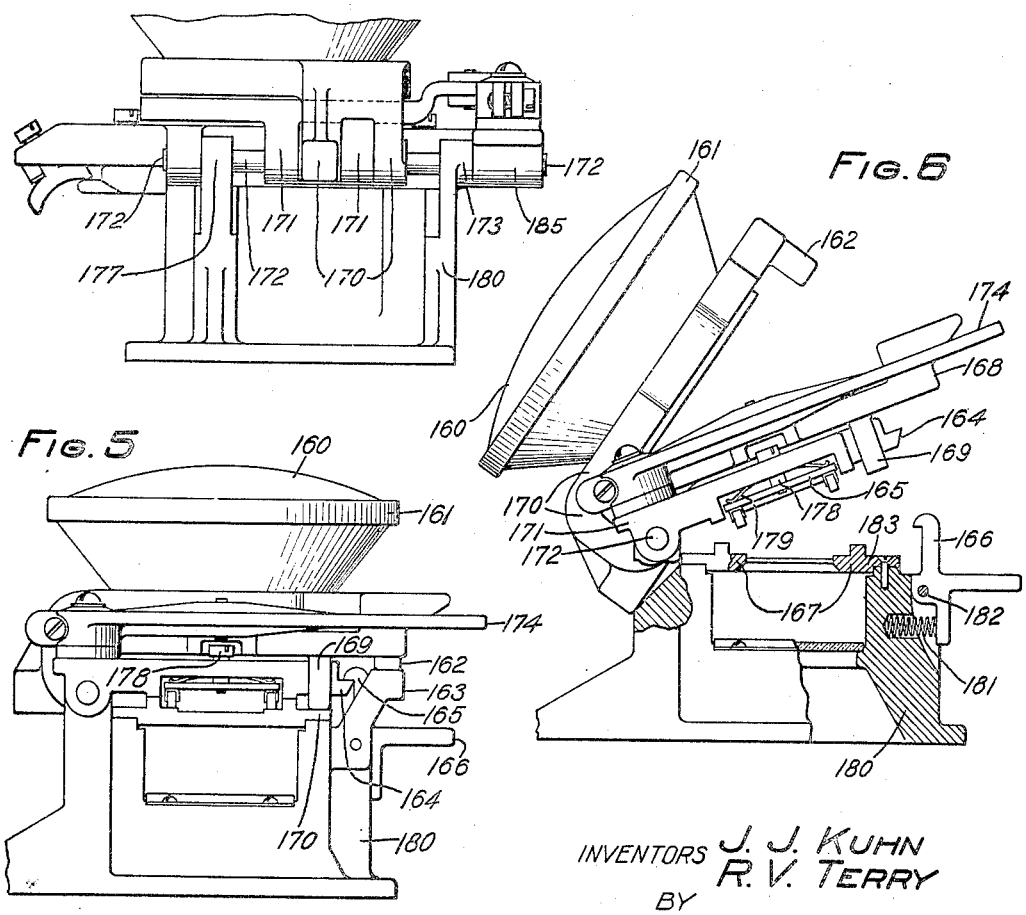
INVENTORS J. J. KUHN
R. V. TERRY
BY
G. H. Heydt.
ATTORNEY Patented Aug. 8, 1933

1,921,469

UNITED STATES PATENT OFFICE 1,921,469

FILM EDITING MACHINE

John J. Kuhn, Elizabeth, and Roy V. Terry, Montclair, N. J., assignors to Bell Telephone Laboratories, Incorporated, New York, N. Y., a Corporation of New York Application March 1, 1930. Serial No. 432,379

6 Claims. (Cl. 88—14)

This invention relates to film editing machines.

In machines heretofore used for the editing of moving picture films, either with or without accompanying sound effects, a viewing lens mounting and a masking plate for framing individual pictures have been made in an inseparable unit. This practice has no doubt been adhered to in order that a fixed relation be maintained between the lens and film regardless of the advantages which may be obtained by making it possible to mark a particular picture directly under the masking plate aperture. The film editing art has advanced to a point where machines are provided for editing separate picture and sound films which films are simultaneously passed through individual film viewing and sound reproducing units. The separate films must be carefully compared and matched and the cuts and splices must be accurately made to produce proper results in a master film combining the separate picture and sound effects. A masking plate which must be raised away from the film guide releases the film permitting it to shift in position. The results obtained by this procedure have not proved satisfactory since very often a film is marked at the wrong picture which brings about a film which is one or two frames short or long. Thus the picture and sound films are slightly out of synchronism. This difference may not be noticed and very often would not be corrected. A film of this character, however, produces an impression of imperfect reproduction.

The object of this invention is therefore to provide a film viewing lens, mask and film guide so arranged that the lens may be raised away from the mask for marking a picture through the mask aperture or that the lens and mask may be raised, away from the film and so arranged that the physical relation of the lens and mask to a film in the guide is fixed.

One embodiment of the present invention comprises a lens in a mounting, a mask having an aperture approximately the size of an individual picture of a moving picture film and a film pad. The lens mounting and mask are hinged to a supporting framework containing a film guide. This framework has thereon individual rests for the lens mounting and mask for maintaining a fixed relation between the lens and film. A latch is required for holding the spring of the film pad compressed to maintain the mask and film in proper position. The lens mounting and mask are individually hinged to a hinging unit which permits either the lens to be raised away from the mask, or the lens, mask and film pad to be raised away from the film. An adjusting lever is provided for shifting the position of the lens and masking plate for framing the pictures of the film. This lever is pivoted to the supporting framework.

A more complete understanding of the invention may be had from the following detailed description, reference being had to the accompanying drawings.

In the illustrated embodiment,

Fig. 1 shows a side elevation of the device with separate picture and sound films on respective reels; Fig. 2 a front elevation to better show the driving mechanism for the film and reels; and Fig. 3 the detail structure of the optical lens system for viewing and editing a picture film.

The sound reproducing unit is shown at 111 and comprises the usual lamp 112, optical slit 113, aperture plate and film pressure pad 114 with associated idler 122, and retaining roller 125, sprocket 121 and the photoelectric cell 115. The film viewing unit is shown at 160, 168 and 133 comprising a lens, a masking plate and film guide and a compartment for a lamp to provide light for the optical system. The two reels shown at the top of Fig. 1 are the take-up reel 101 and the delivery reel 102 for the sound film. The two reels shown in the lower part of Fig. 1 are the take-up reel 104 and the delivery reel 105 for the picture film.

The films 103 and 106 are threaded through the apparatus of the editing machine in the manner illustrated in Fig. 1 and properly positioned at the sound reproducer aperture plate and picture viewing masking plate by the operator to have the sound film in synchronous relation with the picture film. The sound film 103 is carried from delivery reel 102 over idler roller 124, idler 123, idler 122 and drawn through sound film carriage and pressure pad 114 by the sound sprocket 121 and delivered to the take-up reel 101 over retaining roller 125 and idler 120. The film 106 is carried from delivery reel 105 over the idler and retaining rollers, mounted on bracket 137 over the lower segment of hold back sprocket 133 and the guide 136 and drawn through film guide 165 under the lens 160 and masking plate 168 by sprocket 135 and retaining roller 146, thence over idler 134, upper segment of hold back sprocket 133 and retaining roller and idling roller 132, idler roller 131, idler roller 130 to the take-up reel 104.

Consideration will now be given to the driving mechanism for controlling the movement of the sprockets and reels. Switch 153, shown in Fig. 2 is provided for connecting a current source with motor 145. A motor brush shifting lever is shown at 152 controllable by horizontal movement through the agency of lever handle 151. The motor is belt connected to shaft 141 for driving the film editing mechanism as hereinafter described. Meter 155 is also belt connected to shaft 141 for indicating the speed of said shaft which may be altered by altering the speed of the motor. The speed and the direction of rotation of the motor may be changed by the movement of the brush shifting lever 152 controllable from lever handle 151. Shaft 141 terminates in a gear set 142 as shown in Fig. 1. Shaft 147 is driven by the gear set 142 which in turn drives gear sets 143 and 144. The gears in gear set 143 are arranged for driving sprockets 133 and 135. Gear set 143 is also arranged for driving the four reels 101, 102, 104 and 105. These reels are connected to the gear driven pulley 116 by belts 107, 108, 109 and 110. Gear set 144 drives sprocket 121. The gear driven sprockets and reels are thus arranged to carry both the sound and picture films through their respective paths in the film editing machine at a uniform speed. It may be seen that with the arrangement shown there can be no possible loss of synchronism between the sprockets carrying the picture film before the viewing lens and the sound film through the sound reproducing unit. Each reel has therein a friction clutch arranged to compensate for the variance in the film load carried by the reel and thus the speed of rotation of each reel varies according to the amount of film thereon.

The sound unit 111 is associated with amplifier 150. This amplifier may be any of the well known amplifying units used for sound reproduction. Switch 157 is shown for connecting current supply with the amplifier and with lamp 112 of the sound reproducing unit. The manner of exciting the photoelectric cell 115 by light projected from lamp 112 through the sound film is well known in the art. Electric current is produced in the photoelectric cell in accordance with the striations of the sound film which current is amplified by amplifier 111 for transmission to a loud speaker or head receiver. Jack 156 is arranged for the association of a loud speaker or head receiver with the amplifying unit. Switch 154 is provided for connecting a current source with the film viewing lamp 127 mounted inside of encasement 138. This lamp is used under the picture film for supplying light for observation of the pictures as they pass under lens 160.

After the films have been properly positioned the mechanism of the editing machine is thus started by the actuation of switches 153, 154 and 157. Ordinarily, a head receiver is connected by a plug and cord with one of the jacks at 156. Two jacks are provided in order that two head receivers may be used when two editors wish to listen to the reproduction from the sound film. An editor adjusts the masking plate for framing the pictures of the picture film by the movement of lever arm 174 shown in Fig. 1 and Fig. 3. He listens to the sound reproduction and observes the accompanying pictures through lens 160. Any portion of the picture film may be marked for cutting by raising the lens 160 away from the mask 168. The corresponding portion of the sound film may be marked at the aperture plate. These films may be cut and a section removed during the process of reviewing without removing the entire film from the machine.

It is very often desirable to patch a number of picture sections together during the review of a single sound film which may accompany any or all of a plurality of picture sections that may be used to make up a film. Let it be assumed that the editor wishes to remove a picture section that has already been run before the viewing lens. To accomplish this the motor 145 is stopped and thus the movement of the films is arrested. Regulator 152 may be used for stopping the motor independent of switch 153. This regulator may then be adjusted to operate the motor for reversing the direction of rotation of shaft 141. The section of film to be removed is now run before the lens 160 in the reverse direction and the sound film is likewise run in the reverse direction. At this time reels 102 and 105 act in the capacity of take-up reels and reels 101 and 104 as delivery reels. In addition to the friction clutch previously described each reel has therein a driving clutch which is automatically brought into action or released depending upon the direction of rotation of the driving belt and associated pulley. During this procedure the motor is run slowly by reason of the adjustment of regulator 152 in order that the film position for cutting may be readily found. The film to be removed is drawn by hand from reel 105. If a new section of picture film is put in the place of the section removed the sound film need not be altered. However, if the picture section is removed without the insertion of a new section, the related section must accordingly be removed from the sound film 103.

A decided advantage from the viewpoint of ease and accuracy in making such cuts and splices is obtained by the ability to raise the lens mounting away from the masking plate for accurately marking both ends of the section to be removed and later to raise the lens mounting and masking plate away from the film for free movement of the film.

The finished picture film and sound film spliced together to form a master film may be reviewed for final inspection in this same machine. For this purpose, only two reels are used. Reel 105 is used as a delivery reel and reel 101 as a take-up reel. The master film including both sound and picture portions is threaded from reel 105 over idler and retaining rollers 137 and lower segment of hold back sprocket 133, guide 136 through guide 165 under masking plate 168, sprocket 135, and retaining roller 146, idler roller 134, upper segment of hold back sprocket 133, retaining roller and idler rollers mounted on bracket 132, idler roller 122, sound gate 114, sprocket 121 and retaining roller 125, idler roller 120 to take-up reel 101. The mechanism of the editing machine for reviewing the master film is used in the same manner as it is for reviewing the films separately. Since the sound film has been printed to the picture film with the associated sound and picture portions of the film a certain linear distance apart, the picture and sound may be synchronously reviewed by the editor.

In the foregoing description of Figs. 1 and 2, the purpose of the film viewing lens is shown. The detailed structure of this lens and the associated masking plate and film guide is shown in Figs. 3, 4, 5 and 6.

Fig. 3 illustrates the lens 160 broken away to more adequately show the masking plate 168 and the aperture 176 in said masking plate. A lever arm for variably positioning the lens and masking plate is illustrated at 174 pivoted at 175. The hinging mechanism of the lens mounting 161 and the masking plate unit 168 on the base 180 is best shown in Figs. 4 and 6. In these figures the hinge pin 172 is shown with the masking plate hinged piece 171 and lens mounting hinged piece 170 in their related positions. The masking plate and lens mounting are shown only partly open in Fig. 6. This lens mounting 170 and masking plate 171 may be entirely opened for access to the film by further movement of the lens mounting and masking plate upon the hinging unit. Detail structure of the hinging unit is shown in Fig. 4. Hinge pin 172 is shown extending through portions of the base at 173 and 177. These parts are stationary for permitting the movement of hinge pieces 170 and 171 which are attached to the lens mounting and masking plate. Piece 185 is mounted on hinge pin 172 for supporting lever arm 174.

For positioning the lens mounting and masking plate in proper relation to the film, rests 169 and 162 are provided each having a bearing surface upon the stationary base 180. The bearing surface for rest 169 is at 183 shown in Fig. 6 and the bearing surface for 162 is at 163 shown in Fig. 5. By the use of these rests and bearing surfaces the lens mounting and masking plate unit are set in fixed relation to the film since both the rest for the lens mounting and the rest for the masking plate are a part of the stationary base 180. As previously stated, it has been the practice in other film editing machines to have the optical lens unit and the masking plate unit built together in one unit, presumably for the purpose of maintaining a fixed relation between these units and the film. With the arrangement shown in the present invention this fixed relation is maintained, although it is possible to raise the optical lens and its mounting away from the masking plate in order to accurately mark the picture directly under the masking plate aperture.

The lens mounting and masking plate are variably adjustable as a unit for framing an individual picture of a film by reason of the hinge pieces 170 and 171 which are carefully fitted together to maintain the proper horizontal relation between the lens mounting and the masking plate. The movement of lever arm 174 attached to this unit at 175 causes the hinge pieces 170 and 171 to slide on pin 172. The rests 169 and 162 slide along their respective bearing surfaces 183 and 163. A film pad 165 is flexibly attached to the masking plate and movable therewith. The pressure of the pad against the film is controlled by spring 179, the pad being movable on studs 178. In order to bring about the pressure of the pad against the film, the masking plate is latched in position by the spring-controlled latch 166 which fits over projection 164. A pin 182 and spring 181 are provided for maintaining the latch 166 in position. The lens mounting is not latched in position since its weight maintains it against its rest 163. Fig. 5 illustrates the optical lens mounting and masking plate in position with the film pad resting against the film guide, the film not being shown. It should be noted in this figure that stud 178 is slightly raised away from its resting position. The latch 166 is shown in position over the projection 164.

What is claimed is:

1. In a film editing machine, a hinging unit having a single hinge pin, a film viewing lens, a lens mounting hinged to said pin, a mask for said lens having an aperture through which the film may be edited also hinged to said pin, a film guide, a pad for holding said film firmly in said guide, means whereby said lens, mask and pad may be variably positioned with relation to said guide and film, means including said hinging unit whereby the lens and mounting may be raised away from said mask for marking a picture as framed by said mask and means including said hinging unit whereby said lens mounting and mask may be raised as a unit away from said guide and film.

2. In a film editing machine, a hinging unit having a hinge pin, a film viewing lens, a mounting for said lens arranged to slide or rotate on said hinge pin, a masking plate arranged to slide or rotate on said hinge pin, said masking plate having an aperture through which the individual pictures of a film may be viewed, a film guide, a pad for holding said film firmly in said guide, means including said sliding hinge whereby said lens, mask and pad may be variably positioned with relation to said guide and film for framing the pictures of said film, means whereby said lens mounting may be rotated on said pin for raising the lens and mounting away from said mask and means whereby said lens, mask and pad may be rotated as a unit on said pin to raise them away from said guide and film.

3. In a film editing machine, a hinging unit, a lens and lens mounting, a masking plate unit under said lens having an aperture for framing individual pictures of a picture film, a film pad attached to said masking plate unit, a stationary base comprising a film guide, individual rests for the lens mounting and masking plate unit, means including said hinging unit for raising either the lens mounting or the lens mounting and masking plate unit away from said rests, and means for variably positioning said lens and masking plate on said base and at the same time retaining the position of said lens mounting and masking plate unit on said rests.

4. In a film viewing machine a lens and mounting therefore, a masking plate unit, a stationary base having a film guide thereon and a single axial mounting for said lens mounting and masking plate, means including rests for retaining said lens, mask and film guide in a fixed relation with each other, means whereby said lens mounting and masking plate may be moved as a unit along said base and axial mounting for framing the individual pictures of a film as viewed through said lens, means whereby said lens mounting may be rotated on said axial mounting away from said mask and at the same time retaining said mask fixed in position on said rests and means whereby said lens mounting and mask may be rotated as a unit on said axial mounting for adjustment of a film in said film guide.

5. In a film editing machine, a stationary base having a film guide thereon, a lens unit hinged to said base and provided with a protruding rest arranged for registry with a bearing surface on said base, a masking plate unit hinged to said base and provided with a rest arranged for registry with a second bearing surface on said base, a lamp housing attached to said base and having a lamp therein for projecting light through a picture film in said guide to produce an image in said lens, means for sliding said lens and masking units over the bearing surfaces of said base for framing the individual pictures of a film as observed through said lens, means whereby said lens may be raised from the mask for marking the film as framed by said mask, and means whereby both the lens and mask may be raised from the film guide to expose the film for adjustment.

6. In a film editing machine, a lens in a lens mounting, a masking plate unit under said lens having an aperture for framing individual pictures of a picture film, a film pad attached to said masking plate unit, a stationary base comprising a film guide, a lamp housing having a lamp therein, individual rests for the lens mounting and masking plate unit, and a hinge pin, means for separately hinging said lens mounting and masking plate unit to said hinge pin to provide an arrangement whereby the lens mounting may be rotated on the hinge pin and thus raised away from said masking plate and whereby the lens mounting and masking plate may be rotated as a unit on the hinge pin and thus raised away from said film guide, and means whereby said masking plate and lens mounting may be slid as a single unit along said rests and hinge for framing the individual pictures of a film as observed through said lens.

JOHN J. KUHN.
ROY V. TERRY.